United States Patent
Thaler

(10) Patent No.: US 7,447,168 B2
(45) Date of Patent: Nov. 4, 2008

(54) SYSTEM AND METHOD FOR AUTO-NEGOTIATION IN A DATA COMMUNICATION DEVICE

(75) Inventor: Patricia Ann Thaler, Carmichael, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 601 days.

(21) Appl. No.: 10/985,459

(22) Filed: Nov. 10, 2004

(65) Prior Publication Data

US 2006/0098683 A1 May 11, 2006

(51) Int. Cl.
*H04L 5/16* (2006.01)
*H04L 27/10* (2006.01)
*H04J 3/16* (2006.01)

(52) U.S. Cl. .................. 370/296; 370/465; 375/282
(58) Field of Classification Search ............. 370/276, 370/296, 465, 466; 375/282, 333, 361
See application file for complete search history.

(56) References Cited

U.S. PATENT DOCUMENTS

| 4,566,097 | A | * | 1/1986 | Bederman | 370/455 |
|---|---|---|---|---|---|
| 4,701,912 | A | * | 10/1987 | Bueno et al. | 370/474 |
| 5,305,321 | A | * | 4/1994 | Crayford | 370/389 |
| 5,586,117 | A | * | 12/1996 | Edem et al. | 370/466 |
| 5,687,174 | A | * | 11/1997 | Edem et al. | 370/446 |
| 5,712,983 | A | | 1/1998 | Vergnaud et al. | |
| 5,991,303 | A | * | 11/1999 | Mills | 370/402 |
| 6,115,389 | A | | 9/2000 | Mahale et al. | |
| 6,141,350 | A | | 10/2000 | Mahale et al. | |
| 6,141,352 | A | | 10/2000 | Gandy | |
| 6,222,852 | B1 | | 4/2001 | Gandy | |
| 6,504,849 | B1 | * | 1/2003 | Wang et al. | 370/455 |
| 6,507,591 | B1 | | 1/2003 | Bray | |
| 6,600,755 | B1 | | 7/2003 | Overs et al. | |
| 2003/0086515 | A1 | | 5/2003 | Trans et al. | |
| 2003/0179710 | A1 | | 9/2003 | Huff | |
| 2004/0019694 | A1 | | 1/2004 | Engel et al. | |
| 2004/0117674 | A1 | | 6/2004 | Gutman et al. | |
| 2004/0208180 | A1 | | 10/2004 | Light et al. | |

FOREIGN PATENT DOCUMENTS

GB 2200818 A 8/1988

OTHER PUBLICATIONS

Ilango Ganga et al., "802.3ap Auto-Negotiation Proposal with Clause 28 State Machines", Presentation to IEEE 802.3ap Task Force, Sep. 27, 2004, pp. 1-32.
"Part 3: Carrier sense multiple access with collision detection (CSMA/CD) access method and physical layer specifications" IEEE Computer Society, Sponsored by the LAN/MAN Standards Committee, Published by The Institute of Electrical and Electronics Engineers, Inc. 3 Park Avenue, New York, NY 10016-5997, Mar. 8, 2002. pp. 212-260. <http://standards.ieee.org/getieee802/802.3.html>.
The GB Search Report for Application No. GB0521434.1 mailed on Jan. 9, 2006.
Everitt, J. et al., "A 10/100 Mb/s CMOS Ethernet transceiver for 10BaseT, 10BaseTX, and100BaseFX" 1998 IEEE International Solid-State Circuits Conference. Digest of Technical Papers. ISSCC, Feb. 5-7, 1998, San Francisco, pp. 210-211.

* cited by examiner

Primary Examiner—Huy D. Vu
Assistant Examiner—Nittaya Juntima

(57) ABSTRACT

A data communication device configured to communicate with a link partner is provided. The data communication device comprises a port coupled to link partner and an auto-negotiation system configured to generate a first differential Manchester signal that comprises information that identifies at least one mode of operation of the data communication device and configured to transmit the first differential Manchester signal to the link partner using the port.

18 Claims, 3 Drawing Sheets

SYSTEM AND METHOD FOR AUTO-NEGOTIATION IN A DATA COMMUNICATION DEVICE

BACKGROUND

Transceivers are typically electronic devices that communicate with other transceivers or data communication devices by transmitting and receiving information across a wired or wireless medium using a signaling protocol. Transceivers may be designed to conform to one or more industry standards. Such industry standards may specify physical, electrical, and/or mechanical criteria for devices such as transceivers. An industry standard may also describe methods of communicating or performing operations with other devices that comply with standard. One industry standard for transceivers and other devices is IEEE Std 802.3 as published by the Institute of Electrical and Electronics Engineers, Inc. (IEEE), 3 Park Avenue, New York, N.Y. 10016-5997, USA.

Transceivers may include various modes of operation. Examples of such modes of operation include various operating speeds (e.g., 10 Mbps, 100 Mbps, 1 Gbps, or 10 Gbps) or other capabilities (e.g., full-duplex or half-duplex modes) that may be used in conjunction with other transceivers or data communication devices that have a corresponding mode of operation. Auto-negotiation may also be used for other purposes such as exchanging information to tune the performance of the transmitter to adjust for the channel and optimize the signal at the receiver. Clause 28 of IEEE Std 802.3 provides a process known as auto-negotiation which allows transceivers or other devices to communicate their modes of operation to one another so that the most advantageous mode of operation of the devices may be used. Unfortunately, the auto-negotiation protocol defined by Clause 28 has several disadvantages. For example, the protocol may cause devices the negotiation process to operate in a relatively slow manner by using 100 ns link pulses that are transmitted in bursts at intervals of 16+/−8 ms. This may become a problem particularly when devices need to exchange more negotiation information than was originally intended. In addition, the relatively slow signaling rate provided by the protocol may place a low frequency requirement on the analog electrical properties of a device.

It would be desirable to be able to increase the rate at which an auto-negotiation function may be performed between devices while reducing any analog electrical constraints of the devices.

SUMMARY

One exemplary embodiment provides a data communication device configured to communicate with a link partner. The data communication device comprises a port coupled to link partner and an auto-negotiation system configured to generate a first differential Manchester signal that comprises information that identifies at least one mode of operation of the data communication device and configured to transmit the first differential Manchester signal to the link partner using the port.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, an auto-negotiation system and protocol is provided for use in transceivers and other data communication devices. The auto-negotiation system and protocol described herein allows transceivers or other devices to communicate their modes of operation to one another so that the most advantageous mode of operation of the devices may be used. The auto-negotiation system and protocol contemplates the use of differential Manchester signaling between devices such that the devices may perform auto-negotiation faster than the auto-negotiation protocol specified in the current Clause 28 of IEEE Std 802.3 and without a low frequency requirement for devices that comprise the auto-negotiation system.

Figure 1:
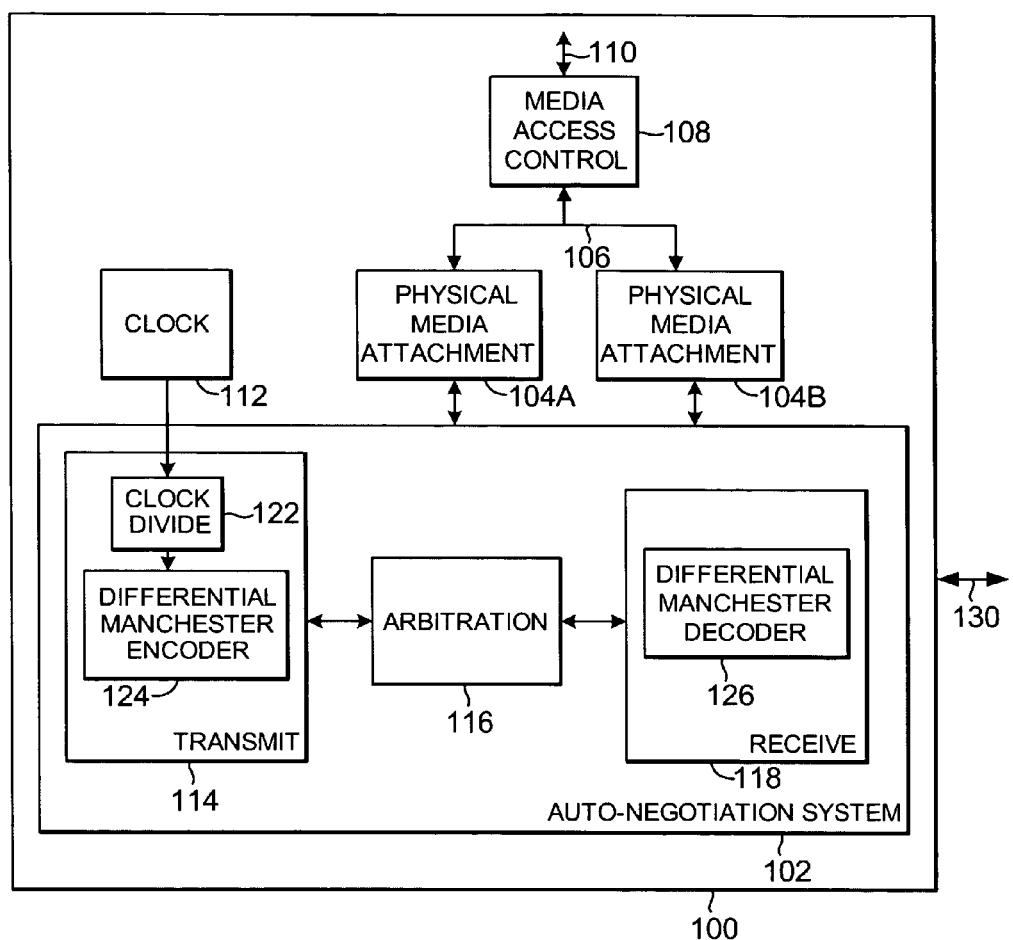
FIG. 1 is a block diagram illustrating one embodiment of a transceiver with an auto-negotiation system.

FIG. 1 is a block diagram illustrating one embodiment of a transceiver 100 with an auto-negotiation system 102. In the embodiment shown in FIG. 1, Transceiver 100 comprises auto-negotiation system 102, a plurality of physical media attachment units (PMA) 104A and 104B, a media access control (MAC) unit 108, and a clock 112. Auto-negotiation system 102 comprises a transmit function 114, an arbitration function 116, and a receive function 118. Transmit function 114 comprises a clock divide unit 122 and a differential Manchester encoder. Receive function 118 comprises a differential Manchester decoder 126. Transceiver 100 communicates with a transceiver or other data communication device (not shown and herein referred to as a link partner) using a port 130.

Transceiver 100 is configured to operate using either PMA 104A or PMA 104B as a data path between port 130 and a MAC client such as a host computer or a switch (not shown) coupled to MAC 108 by a connection 110. In particular, transceiver 100 communicates with a link partner by receiving information from the link partner for the MAC client using connection 110, MAC 108, a media independent interface (MII) 106, PMA 104A or 104B, and port 130. Transceiver 100 also communicates with a link partner by transmitting information from the MAC client to the link partner using connection 110, MAC 108, MII 106, PMA 104A or 104B, and port 130. Port 130 comprises a physical layer interface to PMA 104A and PMA 104B.

PMAs 104A and 104B each comprise different network media such as a 10BASE-T, 100BASE-TX, 100BASE-F4, 1 Gbps Ethernet, or 10 Gbps Ethernet. For example, PMA 104A comprises a 10BASE-T transmission medium and PMA 104B comprises a 100BASE-TX transmission medium in one embodiment. In other embodiments, PMAs 104A and 104B each comprise other types of network media such as the various speeds of Fibre Channel transmission medium. The different types of PMA are shown as separate blocks 104A and 140B, but in one or more embodiments their functions may share the use of some or all of the circuits.

Auto-negotiation system 102 is configured to provide information regarding modes of operation of transceiver 100 to a link partner coupled, directly or indirectly, to port 130. In particular, auto-negotiation system 102 generates pages that comprise the information such as identification of modes of operation of transceiver 100, encodes the pages using differential Manchester encoding, and transmits the pages to the link partner coupled to port 130.

Auto-negotiation system 102 also receives pages encoded in differential Manchester encoding from the link partner coupled to port 130, decodes the pages, and processes the decoded pages to cause a mode of operation of transceiver 100 to be selected. For example, auto-negotiation system 102 causes either PMA 104A or PMA 104B to be connected to port 130 and MAC 106 using a multiplexer or other switching device (not shown) or by changing the operating mode of an underlying circuit capable of operating as either PMA 104A or PMA 104B to match or be compatible with a physical media attachment (not shown) of the transceiver or other device coupled to port 130. Auto-negotiation system 102 may also cause transceiver 100 to operate in full-duplex mode or half-duplex mode to match or be compatible with the transceiver or other device coupled to port 130.

Figure 2:
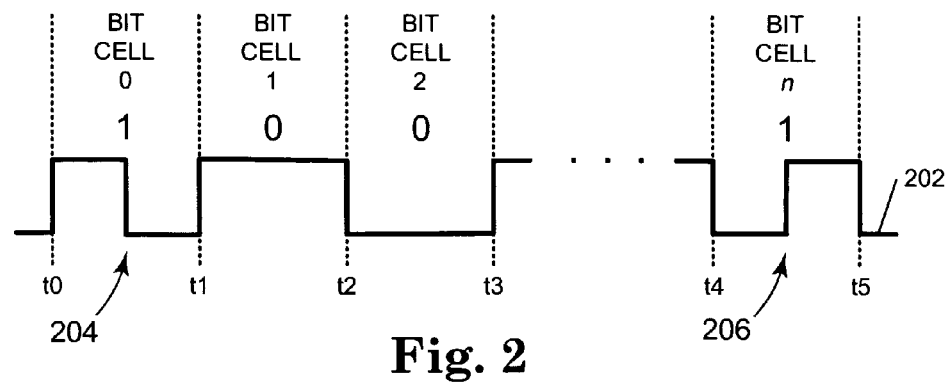
FIG. 2 is a timing diagram illustrating an example of a differential Manchester signal.

FIG. 2 is a timing diagram illustrating an example of a differential Manchester signal 202 includes a page transmitted or received by transceiver 100. Differential Manchester signal 202 comprises a series of bit cells 0 through n where n is an integer that is equal to the number of bits in a page minus one. A page may include any number of bits, n–1, such as 16 bits or 48 bits. Each bit cell is defined by a transition of signal 202 from either a low logic level to a high logic level or a high logic level to a low logic level.

In FIG. 2, the bit cell transitions are shown as occurring at times t0, t1, t2, t3, t4, and t5. Each bit cell comprises an encoded bit of information (i.e., a "0" or a "1"). A bit cell comprises a "1" if the bit cell includes a signal transition within the bit cell. A bit cell comprises a "0" if the bit cell does not include a signal transition within the bit cell. For example, transition 204 and 206 in bit cells 0 and n indicate the bit cells 0 and n comprise a "1", respectively. The lack of a transition in bit cells 1 and 2 indicate that bit cells 1 and 2 comprise a "0". In other embodiments, the encoded bits may be reversed such that a transition within a bit cell indicates that the bit cell comprises a "0" and the lack of a transition within the bit cell indicates a "1".

Figure 3:
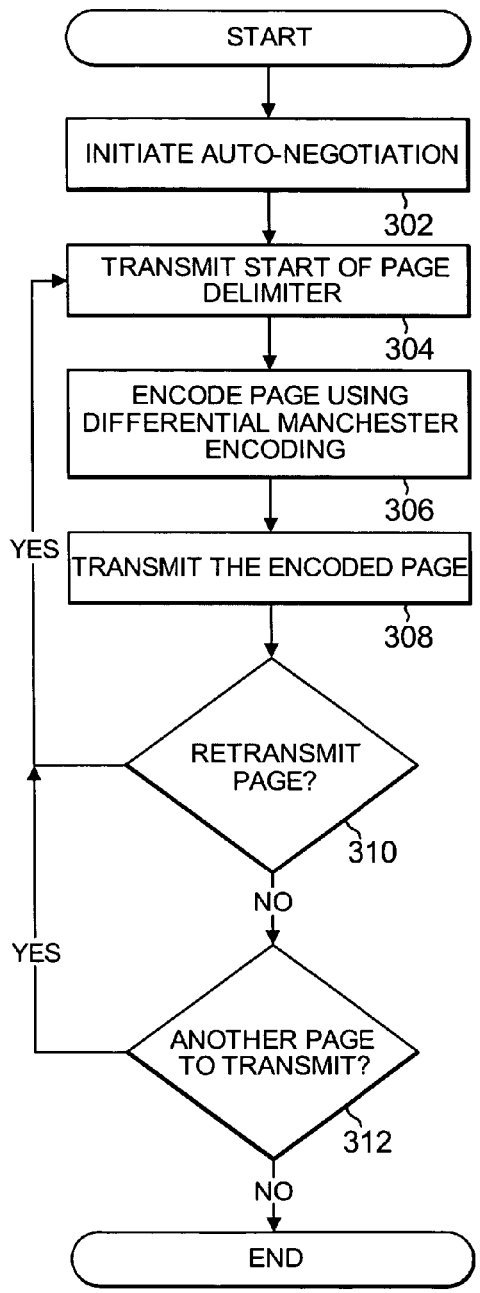
FIG. 3 is a flow chart illustrating one embodiment of a method for transmitting pages using a differential Manchester signal during an auto-negotiation process.

FIG. 3 is a flow chart illustrating one embodiment of a method for transmitting pages using a differential Manchester signal during an auto-negotiation process. The method shown in FIG. 3 is implemented in transmit function 114 in one embodiment.

In FIG. 3, transmit function 114 initiates an auto-negotiation process as indicated in a block 302. Transmit function 114 may initiate the process in response to being powered up, receiving a page from a link partner, or receiving a signal from arbitration function 116 or another component of transceiver 100. Transmit function 114 transmits a start of page delimiter as indicated in a block 304. Examples of start of page delimiters will be described below with reference to FIGS. 5 and 6.

Transmit function 114 encodes a page using differential Manchester encoding as indicated in a block 306. In particular, clock divide unit 122 receives a clock signal from clock 112 and divides the clock signal to generate a divided clock signal. The clock signal from clock 112 may have a frequency that is an integral multiple of the divided clock signal. For example, if the clock signal from clock 112 has a frequency of 10.3125 GBaud, the clock signal may be divided by 33 by clock divide unit 122 to generate a divided clock signal of approximately 315 MBaud. Similarly, clock signals from clock 112 with frequencies of 3.125 GBaud or 1.25 GBaud may be divided by clock divide unit 122 by 10 or 4, respectively, to generate a divided clock signal of approximately 315 MBaud. Clock divide unit 122 provides the divided clock signal to differential Manchester encoder 124.

Differential Manchester encoder 124 receives a page with information that identifies the modes of operation of transceiver 100. In one embodiment, the information in the page comprises the information specified in Clause 28 of IEEE Std 802.3. In other embodiments, the information may comprise other types or arrangements of information other than that specified in Clause 28. Differential Manchester encoder 124 encodes the page using the divided clock signal to generate a differential Manchester signal such as the differential Manchester signal shown in the example of FIG. 2. Differential Manchester encoder 124 encodes a bit of information of the page into each bit cell that comprises the differential Manchester signal.

Transmit function 114 transmits the encoded page to the link partner as indicated in a block 308. In particular, transmit function 114 transmits the encoded page to the link partner on port 130 using the differential Manchester signal. A determination is made by transmit function 114 as to whether the page is to be retransmitted to the link partner as indicated in a block 310. Transmit function 114 may make this determination in response to a signal from arbitration function 116. If the page is to be retransmitted, then transmit function 114 repeats the functions of blocks 304 through 308. Pages may be transmitted until the link partner acknowledges them to ensure that the pages are received.

If the page is not to be retransmitted, a determination is made by transmit function 114 as to whether there is another page to transmit to the link partner as indicated in a block 312. Transmit function 114 may make this determination in response to a signal from arbitration function 116. If there is another page to transmit, then transmit function 114 repeats the functions of blocks 304 through 310. If there is not another page to transmit, then the portion of the auto-negotiation process performed by transmit function 114 ends.

Figure 4:
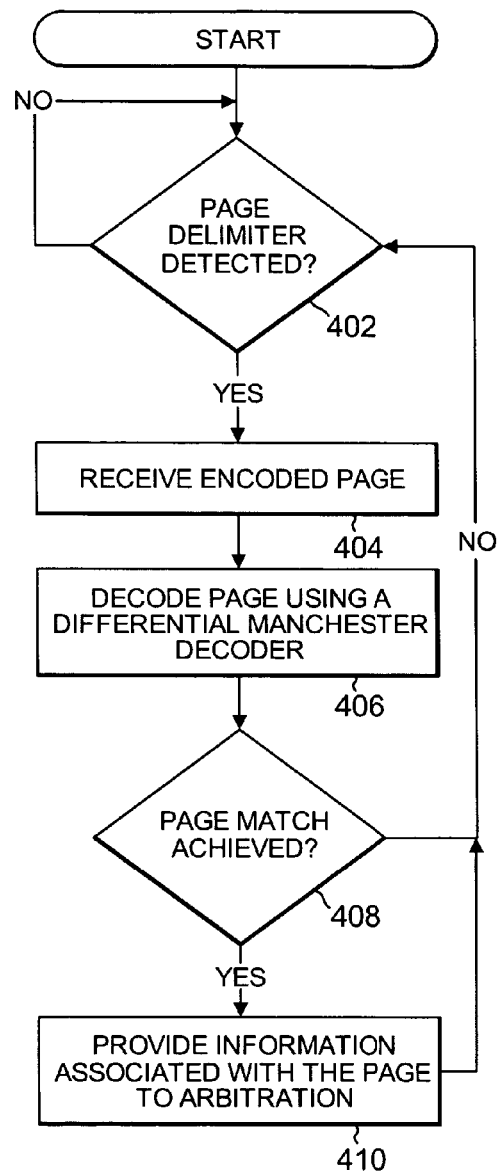
FIG. 4 is a flow chart illustrating one embodiment of a method for receiving pages using a differential Manchester signal during an auto-negotiation process.

FIG. 4 is a flow chart illustrating one embodiment of a method for receiving pages using a differential Manchester signal during an auto-negotiation process. The method shown in FIG. 4 is implemented in receive function 118 in one embodiment.

In FIG. 4, a determination is made by receive function 118 as to whether a page delimiter has been detected as indicated in a block 402. If a page delimiter has not been detected, then the function of block 402 is repeated until a delimiter is detected.

If a page delimiter has been detected, then receive function 118 receives an encoded page as indicated in a block 404. In particular, receive function 118 receives an encoded page from port 130 using a differential Manchester signal. Receive function 118 decodes the page using differential Manchester decoder 126 as indicated in a block 406. In particular, differential Manchester decoder 126 decodes a bit of information of the page from each bit cell that comprises the differential Manchester signal.

A determination is made by receive function 118 as to whether a page match has been achieved as indicated in a block 408. Once the page has been received, receive function 118 determines whether the contents of a number of successively received pages match to protect against bit errors occurring in the received page. For example, receive function 118 may check for matches of three successively received pages. If a page match has not been achieved, then receive function 118 repeats the functions of blocks 402 through 406.

If a page match has been achieved, receive function 118 provides information associated with the page to arbitration function 116 as indicated in a block 410. The information identifies one or more modes of operation of the link partner.

In response to receiving the information associated with the page from receive function 118, arbitration function 116 causes one or more modes of operation of transceiver 100 to be selected and/or activated in accordance with the modes of operation of the link partner. For example, arbitration function 116 causes PMA 104A or 104B to be connected to port 130 and MAC 108 using a multiplexer or switching device (not shown) and may cause a full-duplex or half-duplex mode of operation of transceiver 100 to be selected.

Figure 5:
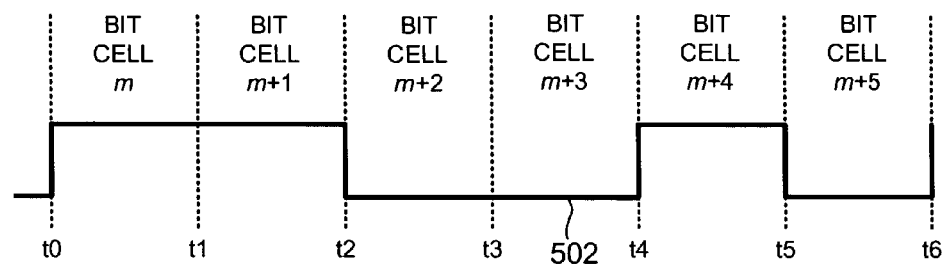
FIG. 5 is a timing diagram illustrating a first example of a page delimiter.

FIG. 5 is a timing diagram illustrating a first example of a page delimiter 502. Page delimiter 502 comprises a Manchester violation. A Manchester violation is a signal that does not conform to the normal Manchester encoding rules. The Manchester violation in page delimiter 502 is a pair of pulses that are longer than the longest pulses normally allowed in a differential Manchester signal. With a differential Manchester signal, a transition occurs at the start of each bit cell. Each pulse of page delimiter 502, however, does not include a transition at the start of at least one bit cell. The first pulse spans bit cells m and m+1 as a transition occurs at times t0 and t2 but not at a time t2. The second pulse spans bit cells m+2 and m+3 as a transition occurs at times t2 and t4 but not at a time t3.

In one embodiment, receive function 118 detects page delimiter 502 where two consecutive pulses are received that do not include a transition at the start of each bit cell. Accordingly, receive function 118 detects the first bit of a page in bit cell m+4 by detecting page delimiter 502.

Figure 6:
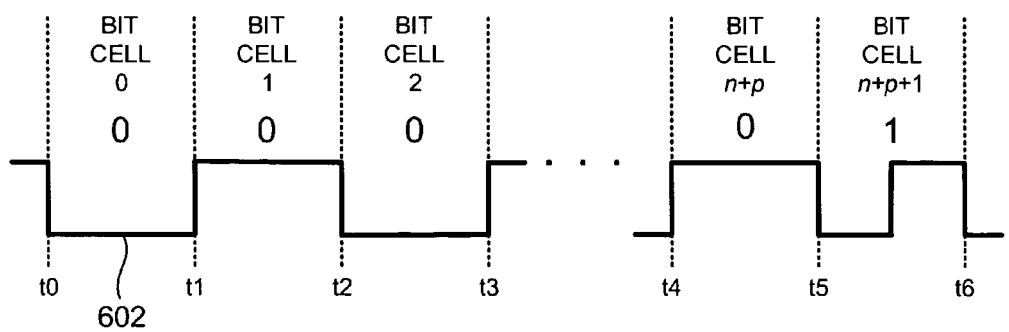
FIG. 6 is a timing diagram illustrating a first example of a page delimiter.

FIG. 6 is a timing diagram illustrating a first example of a page delimiter 602. Page delimiter 602 comprises a string of zeros that is longer than the length of a page followed by a one. Thus, where a page includes n bits, page delimiter 602 comprises a string of zeros that is at least n+p where p is an integer greater than zero. As shown in FIG. 6, bit cells 0 through n+p do not include a transition within the bit cell and therefore comprise zeros as indicated. Bit cell n+p+1 includes a transition within the bit cell and therefore comprises a one as indicated. The one in bit cell n+p+1 is the end of the delimiter.

In one embodiment, receive function 118 detects page delimiter 602 where a one following n+p consecutive zeros are received. Accordingly, receive function 118 detects the first bit of a page in bit cell n+p+2 by detecting page delimiter 602.

In other embodiments, transceiver 100 may include other numbers of PMAs 104 where each PMA 104 has different capabilities or transceiver 100 may include only one PMA 104. In addition, transceiver 100 may include other numbers of MACs 108 and MIIs 106 where each MAC 108 couples to any number of PMAs 104. In such an embodiment, an auto-negotiation system 102 may be included for each MAC 108.

In one embodiment, the functional specifications of Clause 28 of IEEE Std 802.3 may be modified to incorporate differential Manchester encoding and decoding into the auto-negotiation process. In particular, the state diagrams of FIGS. 28-14 through 28-17 in Clause 28 may be modified to operate using page delimiters and pages that are received and transmitted in a differential Manchester format.

With the above embodiments, the speed in which a device performs an auto-negotiation process may be increased. In addition, a device may be designed to perform an auto-negotiation process without including a low frequency analog electrical constraint on the device. Further, the use of differential Manchester signaling may enhance the ability of a device to maintain a lock in a phase locked loop (PLL) of the device.

A device may perform a training sequence where periods of auto-negotiation page exchange are interspersed with periods of sending training patterns from the selected PMA. During the sending of training patterns, the receiver can determine adjustments to the transmitter that are sent during the periods of sending auto-negotiation pages. Because the auto-negotiation process provides a continuous signal including continuous clock information, the training receiver can maintain its PLL lock and other receiver adjustments. This allows the training signal to be acquired quickly at the transition from auto-negotiation to training and may thereby reduce training time.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data communication device configured to communicate with a link partner, the data communication device comprising:
   a port coupled to link partner; and
   an auto-negotiation system comprising a differential Manchester encoding unit configured to:
   generate a first differential Manchester signal by encoding a page that comprises information, which identifies at least one mode of operation of the data communication device;
   transmit the first differential Manchester signal to the link partner using the port; and transmit a delimiter comprising a plurality of bits having a first logic level followed by a bit having a second logic level prior to transmitting the first differential Manchester signal to the link partner, and wherein a number bits of the plurality of bits exceeds a number of bits in the page.

2. The data communication device of claim 1 further comprising: a first data path; and a second data path; wherein the at least one mode of operation is associated with the first data path or the second data path.

3. The data communication device of claim 1 wherein the auto-negotiation system is configured to transmit a delimiter including at least one Manchester violation to the link partner prior to transmitting the first differential Manchester signal to the link partner.

4. The data communication device of claim 1 wherein the auto-negotiation system comprises a clock divide unit configured to generate a divided clock signal, and wherein the differential Manchester encoding unit is configured to encode the page to generate the first differential Manchester signal using the divided clock signal.

5. The data communication device of claim 1 wherein the auto-negotiation system is configured to receive a second differential Manchester signal from the link partner using the port.

6. The data communication device of claim 5 wherein the auto-negotiation system comprises a differential Manchester decoding unit configured to decode the second differential Manchester signal.

7. The data communication device of claim 6 further comprising: a first data path; and a second data path; wherein auto-negotiation system is configured to cause the first data path or the second data path to be selected in response to decoding the second differential Manchester signal.

8. The data communication device of claim 1 wherein the first differential Manchester signal comprises a plurality of bit cells, wherein each of the plurality of bit cells comprises either a first logic level defined by a signal transition within the bit cell or a second logic level defined by a lack of the signal transition within the bit cell.

9. A method comprising:
 generating a first differential Manchester signal that comprises information, which includes at least one mode operation of a data communication device;
 transmitting the first differential Manchester signal to the link partner using a port of a data communication device; and
 transmitting a delimiter comprising a plurality of bits having a first logic level followed by a bit having a second logic level prior to transmitting the first differential Manchester signal to the link partner, wherein a number bits in fue plurality of bits exceeds a number of bits in the page.

10. The method of claim 9 wherein the at least one mode of operation identifies a data path of the data communications device.

11. The method of claim 9 further comprising: generating a divided clock signal; and encoding the information to generate the first differential Manchester signal using the divided clock signal.

12. The method of claim 9 further comprising: receiving a second differential Manchester signal from the link partner using the port.

13. The method of claim 12 further comprising: decoding the second differential Manchester signal.

14. The method of claim 13 further comprising: selecting a first data path or a second data path for operation in response to decoding the second differential Manchester signal.

15. The method of claim 9 wherein the first differential Manchester signal comprises a plurality of bit cells, wherein each of the plurality of bit cells comprises either a first logic level defined by a signal transition within the bit cell or a second logic level defined by a lack of the signal transition within the bit cell.

16. A system comprising:
 a differential Manchester encoding unit configured to: generate a first differential Manchester signal by encoding a page that comprises information, which identifies at least one mode of operation of the data communication device; transmit the first differential Manchester signal to a link partner using a port; and transmit a delimiter comprising a plurality of bits having a first logic level followed by a bit having a second logic level prior to transmitting the first differential Manchester signal to the link partner, and wherein a number bits in the plurality of bits exceeds a number of bits in the page.

17. The system of claim 16 further comprising: means for decoding a second differential Manchester signal received from the link partner using the port.

18. The system of claim 17 further comprising: means for selecting a first data path or a second data path for operation in response to decoding the second differential Manchester signal.

* * * * *

UNITED STATES PATENT AND TRADEMARK OFFICE
CERTIFICATE OF CORRECTION

PATENT NO. : 7,447,168 B2 Page 1 of 1
APPLICATION NO. : 10/985459
DATED : November 4, 2008
INVENTOR(S) : Patricia Ann Thaler It is certified that error appears in the above-identified patent and that said Letters Patent is hereby corrected as shown below:

Column 7, Line 25-27, Claim 9, delete "generating a first differential Manchester signal that comprises information, which includes at least one mode operation of a data communication device;" and insert -- generating a first differential Manchester signal by encoding a page that comprises information, which identifies at least one mode of operation of the data communication device; --;

Column 7, Line 35, Claim 9, delete "fue" and insert -- the --, therefor.

Signed and Sealed this

Twenty-third Day of November, 2010

David J. Kappos
*Director of the United States Patent and Trademark Office*